United States Patent
Holmquist et al.

(10) Patent No.: US 7,502,697 B2
(45) Date of Patent: Mar. 10, 2009

(54) AC OUTPUT POWER SUPPLY WITH DIGITAL FEEDBACK LOOP

(75) Inventors: Gunnar R. Holmquist, Santee, CA (US); Liyu Cao, San Diego, CA (US); Daniel D. Zuck, Escondido, CA (US)

(73) Assignee: Programmable Division of Xantrex Technology, Inc., San Diego, CA (US)

( * ) Notice: Subject to any disclaimer, the term of this patent is extended or adjusted under 35 U.S.C. 154(b) by 0 days.

(21) Appl. No.: 11/540,938

(22) Filed: Sep. 28, 2006

(65) Prior Publication Data
US 2008/0082277 A1 Apr. 3, 2008

(51) Int. Cl.
*G06F 19/00* (2006.01)
(52) U.S. Cl. ........................................ 702/60
(58) Field of Classification Search ................ 702/60
See application file for complete search history.

(56) References Cited

U.S. PATENT DOCUMENTS 7,023,672 B2    4/2006  Goodfellow et al.
7,145,266 B2 *  12/2006 Lynch et al. ................. 307/65

FOREIGN PATENT DOCUMENTS

WO    WO 03/010877    *  2/2003

* cited by examiner

*Primary Examiner*—Tung S Lau
(74) *Attorney, Agent, or Firm*—Knobbe Martens Olson & Bear LLP

(57) ABSTRACT

An AC power supply includes a digital feedback loop for output regulation. The feedback loop generates an RMS control signal that is mixed with a desired waveform to produce an input for a feedback loop that generates an instantaneous control signal. The instantaneous control signal is used to regulate power supply output.

4 Claims, 7 Drawing Sheets

AC OUTPUT POWER SUPPLY WITH DIGITAL FEEDBACK LOOP

BACKGROUND OF THE INVENTION

1. Field of the Invention

The present invention relates generally to power supplies and, more particularly, to power supplies with feedback loops.

2. Description of the Related Art

Power supplies typically provide a voltage at a preset or programmed output level to a load impedance. Since the physical output impedance of a power supply is never zero, absent a compensating scheme, the output voltage of the power supply would experience a deviation from the desired value dependent on the impedance of the load. Feedback loops are typically employed to compensate for load-dependence of the output voltage such that a constant output voltage is maintained as the current sourced by the power supply changes.

Recently, power supplies and voltage regulators that use digital feedback loops instead of analog feedback loops have been described. See, for example, Merrill, "Digital Feedback Power Supply" (U.S. Pat. No. 5,969,514); Goodfellow, "Digitally Controlled Voltage Regulator" (U.S. Pat. No. 7,023,672). The digital feedback loop is distinguishable from the analog feedback loop in that in the former, the analog signal representing the output voltage is converted into digital data by an analog-to-digital-converter (ADC) and at least some of the signal processing associated with the feedback loop is done in the digital domain.

Although prior art power supplies with an analog or a digital feedback loop provide a constant voltage source for some applications, the flexibility is still limited. In some environments, digital output regulation has never been implemented.

SUMMARY OF THE INVENTION

In one embodiment, the invention comprises a power supply comprising power hardware having an AC power output configured for coupling to a load impedance, the AC power output configured to provide an AC output voltage and an AC output current to the load impedance, one or more output parameter sensors, and analog to digital converters configured to produce digital representations of sensed output parameters. The power supply also includes a digital feedback loop receiving the digital representations and coupled to regulate the power hardware.

In another embodiment, a method of controlling an AC power supply comprises generating a digital instantaneous control signal, wherein generating the digital instantaneous control signal comprises generating a digital RMS control signal, and regulating one or both of the AC output voltage and the AC output current using the digital instantaneous control signal.

In another embodiment, a programmable AC power supply comprises an AC power output configured for connection to a load impedance and a logic circuit configured to be programmed by a user to control AC power supply output parameters. The logic circuit is programmable to at least control the AC power output to provide a periodic voltage waveform to the load impedance having a user definable amplitude. One or more sensors coupled to the AC power output and configured to sense one or both of an AC output voltage and an AC output current of the AC power supply are provided, as are one or more analog-to-digital converters configured to digitize outputs of the one or more sensors. In addition, one or more digitally implemented feedback loops receive outputs of the one or more analog-to-digital converters and are configured to maintain one or more power supply output parameters substantially in accordance with user programmed parameters defined by the logic circuit.

In another embodiment, a method of regulating an AC power supply output comprises combining a voltage setpoint with a power supply output RMS control signal to produce a reference value, mixing the reference value with a desired waveform to produce a reference signal, and combining the reference signal with power supply output feedback signals to produce a power supply output control signal.

DETAILED DESCRIPTION OF THE PREFERRED EMBODIMENT

While various embodiments of the invention are described below, they are to be construed as illustrative and not restrictive in character. All changes and modifications that are within the understanding of a person of ordinary skill in the art are desired to be protected. For example, a person of ordinary skill in the art would readily understand that some of the functional blocks in the figures illustrating various embodiments may be implemented by control software or by hardware logic or by a firmware comprising of both hardware logic and control software.

Figure 1:
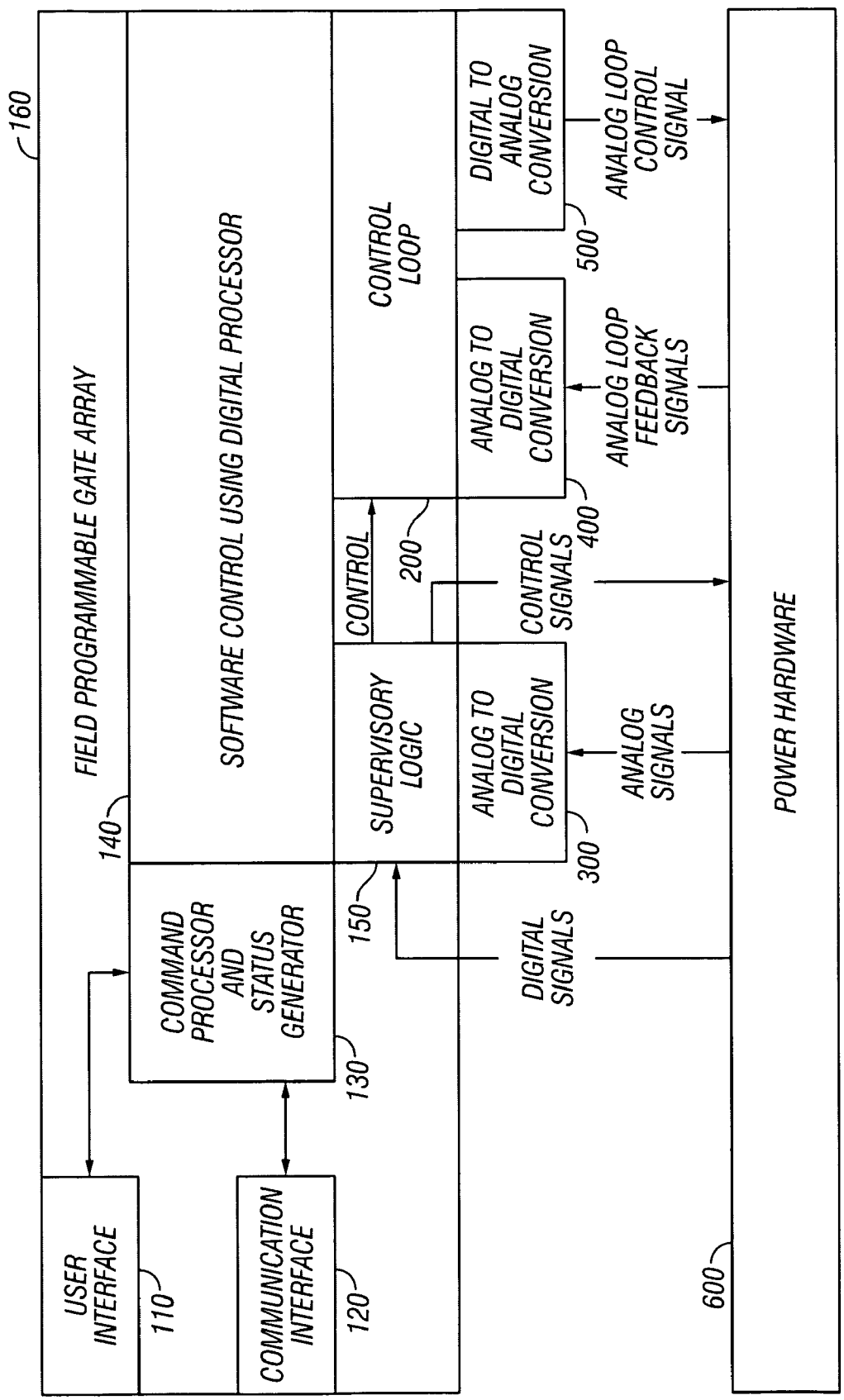
FIG. 1 is a block diagram illustrating the power supply of the invention.

FIG. 1 is a block diagram of a power supply according to one embodiment of the invention. The power supply comprises a power supply digital control 160, and power hardware 600. The power supply digital control 160 may include a user interface 110, a communication interface 120, a command processor/status generator 130, a digital processor for running control software, supervisory logic 150, and a control loop 200, which in a preferred embodiment are all implemented in a field programmable gate array. The power supply digital control further includes analog to digital and digital to analog data converters. The data converters may include a first analog-to-digital converter (ADC) unit 300, a second ADC unit 400, and a digital-to-analog converter (DAC) unit 500.

The command processor/status generator 130 is connected to the user interface 110 and to the communication interface 120. The command processor/status generator 130 is connected to the digital processor 140 for software control. Both the supervisory logic 150 and the control loop 200 are connected to the digital processor 140. The first ADC unit 300 is connected to the supervisory logic 150, and the second ADC unit 400 and the DAC unit 500 are connected to the control loop 200.

In operation, the command process/status generator 130 receives programmable values including a pre-set RMS voltage ($V_{set}$) and/or a pre-set RMS current ($I_{set}$) and/or one or more parameters defining desired output waveform having a frequency ($F_{set}$) through the user interface 110 or the communication interface 120. In some embodiments, the waveform frequency can be 0, such that the AC power supply can also be configured to output a DC voltage if desired. In a preferred embodiment, any or all of the pre-set RMS voltage, the pre-set RMS current, and the waveform parameters may be programmed by a user. Alternatively, the pre-set RMS voltage and/or the pre-set RMS current, and/or the output waveform and frequency may be dynamically generated during power supply operation protocols by control software that may run inside or outside the power supply digital control.

Continuing with the description of operation of this embodiment, the control loop 200 receives the pre-set voltage amplitude, the pre-set current amplitude, and the digital feedback signals sent by the power hardware 600 and converted by the second ADC unit 400. The control loop, by using one of the RMS voltage feedback loop and the RMS current feedback loop and an instantaneous voltage controller 250 to be described in detail with respect to FIG. 6, generates a digital control signal which gets converted into an analog control signal by the DAC unit 500. The power hardware 600 receives the analog control signal and its output is regulated in accordance with this signal.

The power supply digital control is configured to provide a control signal that causes the power hardware to operate at any of a wide variety of programmed outputs. This is done by selectively employing digital feedback loops, including an RMS voltage feedback loop and an RMS current feedback loop, inside the control loop 200 as will be described in more detail below.

FIG. 1 illustrates the digital control and processing as implemented in combinatorial and sequential logic, one example of which is a field programmable gate array, and this is one possible implementation. It will be appreciated that a wide variety of implementations are possible. The digital functions may, for example, be implemented in firmware executed by a microprocessor or digital signal processor. Discrete logic hardware may also be utilized for some or all functions. In addition, it will be appreciated that some of the functions described below can be performed in the analog domain. As used herein, the term "digital feedback loop" refers to a feedback regulation system where at least some, but not necessarily all, of the processing performed during loop operation is done with digital signal processing techniques. It is generally advantageous, however, to perform most or all of the control loop functions in the digital domain.

The feedback loops described herein provide tight output regulation and wide ranging flexibility of output voltage and output current as well as output frequency. Power supplies in accordance with some embodiments of the invention are configured to operate under user control as a waveform and RMS value programmable voltage or current source that also incorporates programmable peak current limiting and output impedance. It will be appreciated that power supplies incorporating the inventive principles described herein can be configured to operate under any other output regulation scheme as well. In many advantageous embodiments, the output is a programmable AC waveform having a digital feedback loop controlling the RMS value of output voltage or current. In this embodiment, the digital feedback provides highly accurate and flexible output regulation in a programmable power supply that has not been previously obtained.

The AC power supplies described herein have a variety of applications. For example, they are often used to provide well regulated input power to electrically powered appliances and equipment being performance tested. Input voltages, AC waveform shapes, frequency, and the like can be user controlled to test appliance performance under a variety of input power conditions. The digital control described herein provides increased flexibility and accuracy for such testing, improving test repeatability and accuracy.

Figure 2:
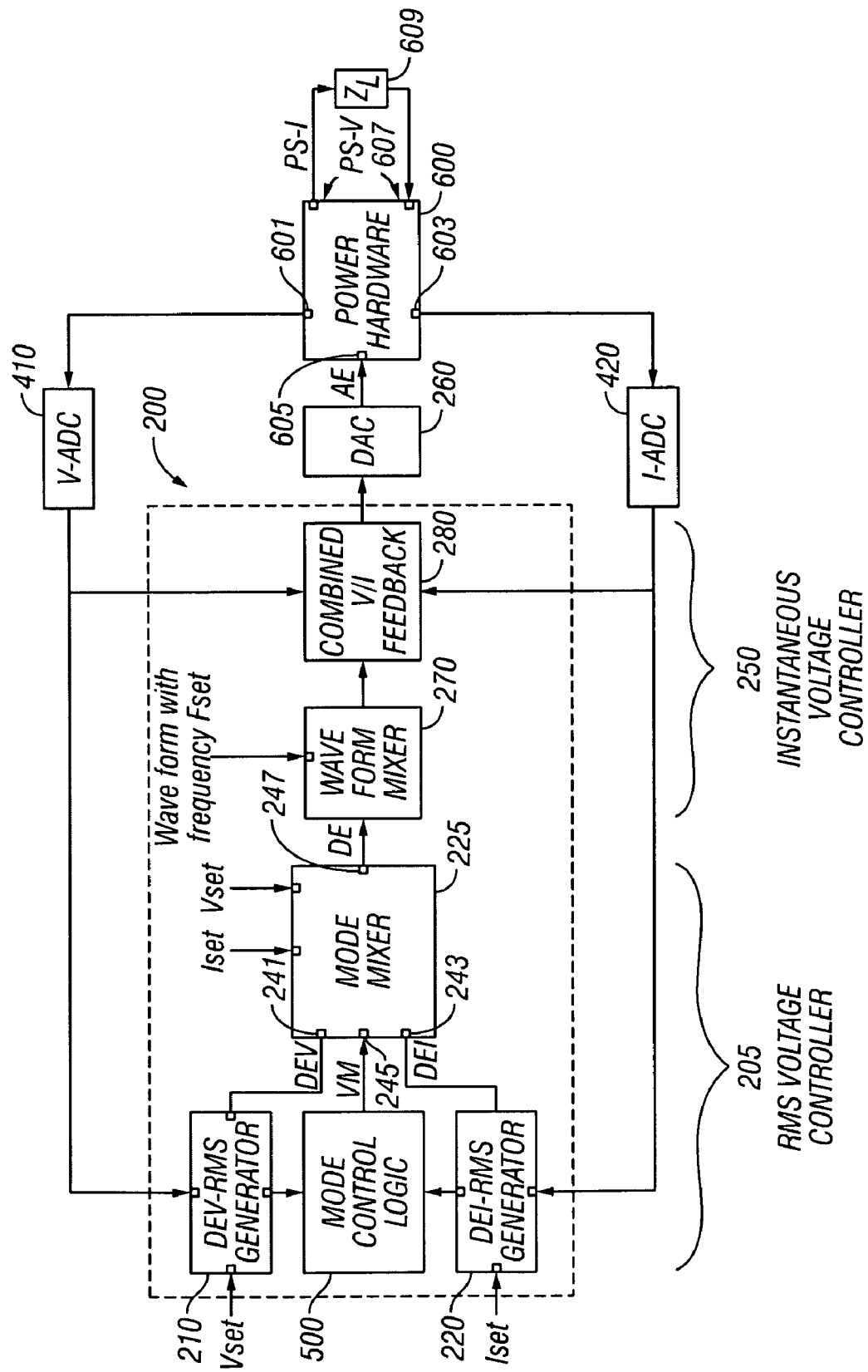
FIG. 2 is a schematic block diagram illustrating the digital feedback loop according to an embodiment of the invention.

FIG. 2 is a schematic block diagram illustrating a digital feedback loop according to one embodiment of the present invention. The digital feedback loop includes an RMS controller 205 and an instantaneous voltage controller with peak current limiter 250. The RMS controller 205 includes a digital RMS voltage error (DEV-RMS) generator 210, a digital RMS current error (DEI-RMS) generator 220, mode control logic 500, and mode mixer logic 225. The instantaneous voltage controller with peak current limiter 250 includes a wave form mixer 270 and a combined voltage/current feedback 280. The power hardware 600 includes a voltage sensor output 601, a current sensor output 603, a control input 605 and power outputs 607.

In this embodiment, the digital control loop comprises an RMS voltage (V-RMS) loop, an RMS current (I-RMS) loop, and an instantaneous voltage loop with peak current limiting. The V-RMS loop is configured to receive an analog signal that represents the power supply AC output voltage and to generate a digital signal that represents a modified RMS value based on the pre set value which is necessary to generate the pre set RMS value of the output voltage. The I-RMS loop is configured to receive an analog signal that represents the power supply AC output current and to generate a digital signal that represents a modified RMS value based on the pre set value which is necessary to generate the pre set RMS value of the output current. The V-RMS loop and the I-RMS loop will be described in detail below with reference to FIG. 3.

The input of the V-ADC 410 is connected to the voltage sensor output 601 of the power hardware 600. The DEV-RMS generator 210 includes a first input, a second input, and an output. The first input is connected to the output of the V-ADC 410. The second input is configured to receive the pre-set RMS voltage amplitude ($V_{set}$). The input of the I-ADC 420 is connected to the current sensor output 603 of the power hardware 600. The DEI-RMS generator 220 includes a first input, a second input, and an output. The first input is connected to the output of the I-ADC 420. The second input is configured to receive a pre-set RMS current amplitude ($I_{set}$).

The mode mixer logic 225 has a first signal input 241, a second signal input 243, a control input 245, and an output 247. The first signal input 241 is connected to the output of the DEV-RMS generator 210, and the second signal input 243 is connected to the output of the DEI-RMS generator 220. The control input 245 is connected to the output of the mode control logic 500. The output 247 is connected to the input of a wave form mixer 270. The wave form mixer produces a time varying output having an amplitude defined by the output of the mode mixer. The wave shape will be sinusoidal in many applications having a user set frequency of $F_{set}$, but in some embodiments, the shape is programmable by the user to be any desired waveform, e.g. square, triangular, distorted sine waves, etc.

The output of the waveform mixer 270 is connected to the input of the combined V/I feedback 280. The output of the combined V/I feedback 280 is connected to the input of the DAC 260. The output of the DAC 260 is connected to the control input 605 of the power hardware 600, completing the digital feedback loop. The power outputs 607 of the hardware are configured to be connected to a load impedance 609.

As described above, the control loop 200 is implemented digitally, typically in a gate array and/or software controlled microprocessor architecture. It will accordingly be appreciated that although illustrated as a series of separate blocks in FIGS. 2-6, the functions performed by those blocks need not be performed by discrete or separate hardware circuits. The mode switch logic, for example, is illustrated as a physical switch, but can be implemented with any decision logic that determines whether the DEV value or DEI value is being utilized at any given time for subsequent processing in the control loop.

In operation, the system is usually configured to supply a constant (in RMS value) AC output voltage (PS-V) at a selected frequency and waveform (which will often be sinusoidal) to the load impedance 609. The V-ADC 410 receives an analog signal representative of the PS-V from the voltage sensor output 601 of the power hardware 600 and converts it into a digital value. The DEV-RMS generator 210 receives the digital value from the V-ADC 410 and digital data representing $V_{set}$ and generates a digital error voltage signal (DEV-RMS) that represents a difference between the RMS set point and the RMS value of the supply output voltage. Similarly, the I-ADC 420 receives an analog signal from the current sensor output 603 of the power hardware 600 and converts it into a digital value. The DEI-RMS generator 220 receives the digital value from the I-ADC 420 and digital data representing $I_{set}$ and generates a digital error current signal (DEI-RMS) that represents a difference between the $I_{set}$ and the RMS value of the power supply output current.

The DEV-RMS and DEI-RMS are both received by the mode mixer block 225. The mode control logic 500 generates a mode control variable (VM) that causes the mode mixer block 225 to select for further processing one of the DEV-RMS and the DEI-RMS signals. The wave form mixer 270 takes the mode mixer block output and performs a digital mixing of the RMS voltage control signal with a user defined waveform. The result is used as the reference input to the instantaneous voltage controller with combined voltage/current feedback. The wave form mixer 270 and the combined V/I feedback loop 280 will be discussed in additional detail below with reference to FIG. 5.

The combined V/I feedback loop 280 subtracts a portion of the output of the V-ADC 410 that is related to the instantaneous AC output voltage and may also subtract a portion of the output of the I-ADC 420 that is related to the instantaneous AC output current from the reference voltage waveform output by the waveform mixer 270 to generate an instantaneous error signal. In the embodiments described below, the current feedback of the feedback block 280 is zero unless there is a current excursion above a pre-set peak current limit. The DAC 260 takes the instantaneous error signal and converts it into an analog control signal. The power hardware 600 receives the analog control signal and regulates its power outputs 607.

Figure 3:
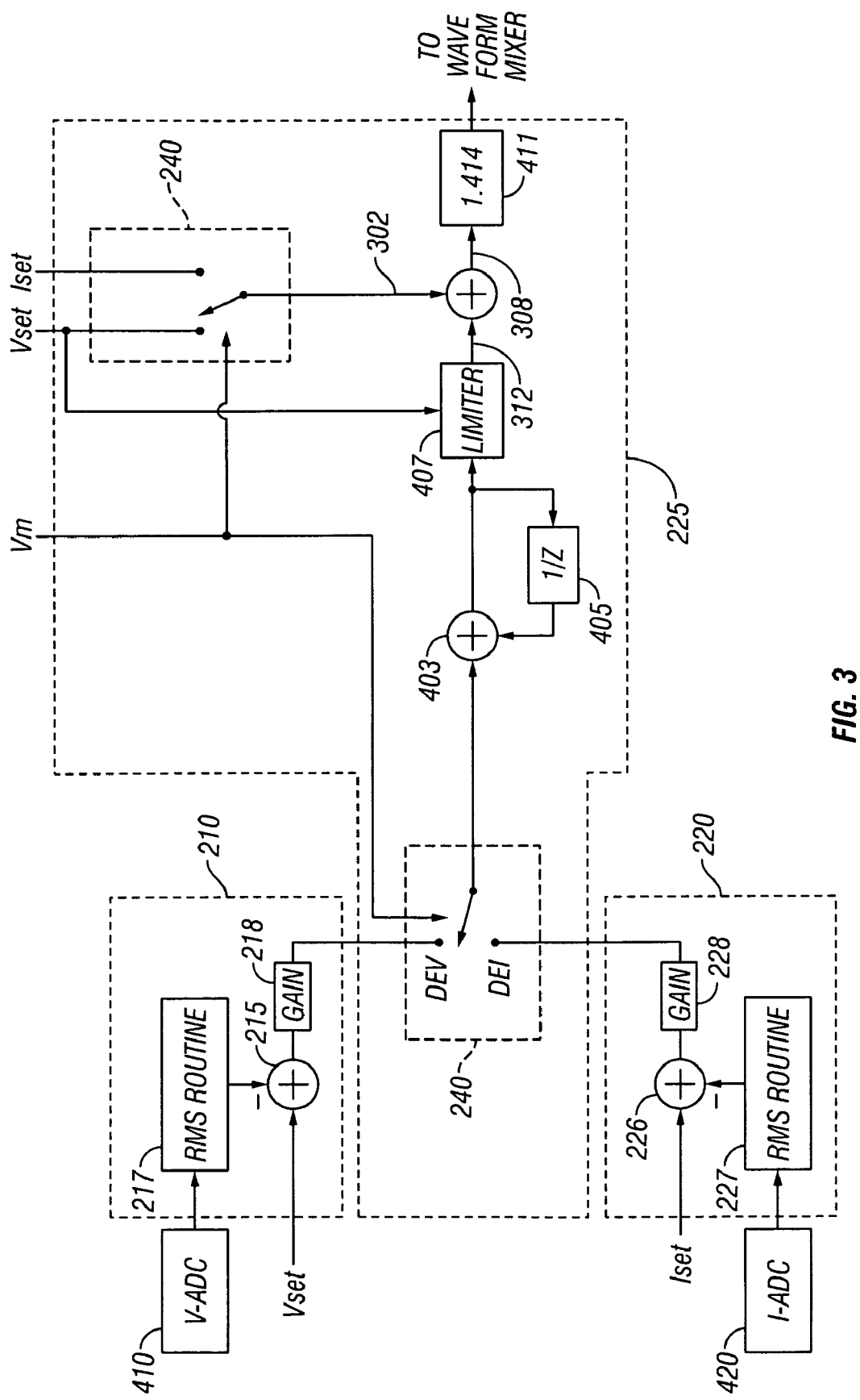
FIG. 3 is a block diagram illustrating the RMS voltage/ RMS current feedback loops of the digital feedback loop according to an embodiment of the invention.

FIG. 3 shows a block diagram illustrating the RMS voltage and RMS current feedback loops of the digital feedback loop according to an embodiment of the present invention.

The RMS voltage feedback loop includes a first analog-to-digital converter (V-ADC) 410 as shown in FIG. 2, a first subtractor 215, and a first RMS routine block 217, and gain block 218. The input of the V-ADC 410 is connected to the voltage sensor output 601 of the power hardware 600, and the output of the V-ADC 410 is received by the input of the first RMS routine block 217. The positive input of the first subtractor 215 receives the pre-set voltage RMS value ($V_{set}$).

In operation, the V-ADC 410 digitizes the voltage sensor 601 output and generates a series of digital output voltage values. The first RMS Routine 217 takes the series of digital output voltage values and computes an RMS voltage value using a sliding-window RMS averaging method, which is described below. The first subtractor 215 takes the pre-set voltage RMS ($V_{set}$) and the measured RMS voltage value and subtracts the latter from the former.

The RMS current feedback loop includes a second analog-to-digital converter (I-ADC) 420, a second subtractor 226, and a second RMS routine 227 and gain block 228. The input of the I-ADC 420 is connected to the current sensor output 603 of the power hardware 600, and the output of the I-ADC 420 is received by the input of the second RMS routine 227. The positive input of the second subtractor 226 receives the pre-set current amplitude value ($I_{set}$).

In operation, the I-ADC 420 digitizes the current sensor output 603 and generates a series of digital output current values. The second RMS Routine 227 takes the series of digital output current values and computes an RMS current value also using the sliding-window RMS averaging method originally mentioned above. The second subtractor 226 takes the pre-set current RMS amplitude ($I_{set}$) and the RMS current value and subtracts the latter from the former.

In preferred embodiments, a sliding-window RMS averaging method is used by the RMS voltage feedback loop and the RMS current feedback loop to compute the RMS voltage value and the RMS current value of the power supply output. The sliding-window RMS averaging minimizes the control loop delays and improves control loop bandwidth by updating the RMS values after digitization of each fresh sample by either V-ADC or I-ADC.

The conventional calculation for RMS values of a sampled signal involves the following:

$$RMS(s)=SQRT(\Sigma_{i=1\ to\ n}s_i^2/n) \quad\quad\quad 1)$$

Equation 1 above sums up the squares of the sample values s for the signal being regulated over one or more complete cycles of the AC waveform, whether that is voltage or current, and then divides the sum of squares by the number of samples n in the sum, and finally takes the square root to result in the root-mean-squared (RMS) value for the sampled signal. If the value computed in this way is used as an input to the subtractors 215 or 226 for error generation and regulation against a desired RMS setpoint, the RMS control loop must wait until the calculation is complete before it gets a new RMS value. For a periodic signal, this means that the RMS control loop must wait up to one full fundamental period before it is given a new value to deliver to the subtractor and to produce a new control value for the power hardware.

To eliminate this delay, preferred embodiments of this invention use either of the following algorithms represented by the following two equations for computation of a RMS value for a sampled signal:

$$RMS(s)=SQRT(((\Sigma_{i=k\ to\ k+n-1}s_i^2)+s_{k+n}^2-s_k^2)/n) \quad\quad 2)$$

$$RMS(s)=SQRT(((\Sigma_{i=k\ to\ k+n-1}s_i^2)-s_k^2+s_{k+n}^2)/n) \quad\quad 3)$$

Equation 2 represents one version of the improved no-delay approach. Equation 3 represents another version of the improved no-delay approach. For either approach, the number of samples in the sum is still n, but Equation 2 forms a sum with n+1 samples then subtracts the oldest sample from the n+1 sampled sum to result in a sum with n samples. To perform either of these algorithms the hardware stores the squares of the last n samples in a ring buffer, and stores a sum of these values from the square of sample k to the square of sample k+n−1, where n samples are taken over the course of one complete cycle of the AC waveform. To produce an updated RMS value for input to the subtractor in the control loop, the square of sample k+n is added to the sum, and the square of the oldest sample k is subtracted from the sum. The revised sum is divided by n and a square root is performed. The square of the newest sample k+n is stored in the ring buffer in place of the square of the oldest sample k. Equation 3 differs from Equation 2 in the order that this addition and subtraction are done; the ring buffer is still used in Equation 3 to keep track of the last n samples.

The approaches of Equations 2 and 3 mean that the RMS control loop always has the latest RMS value no more than one sample old, and not one whole fundamental period old, thereby minimizing or virtually eliminating delay for the RMS control loop. Thus the RMS control loop will be much more responsive to changes in load and output conditions of the power supply.

The application of Equation 3 to a non-periodic wave form is identical to the periodic case, except that since there is no period over which the RMS calculation is being done, the result is that the value n, the number of samples over which to compute the RMS value, is chosen by considerations involving how relevant the oldest samples k+1 is to the newest sample k+n. This consideration of course depends upon the desired responsiveness of the RMS control loop, and how relevant old features of the signal are in the RMS regulation.

In a particularly preferred embodiment, the responsiveness of the RMS calculation is improved even further for periodic wave forms that have odd symmetry about their zero crossing, such as a sine wave. In these embodiments, the sampled window where all n samples are taken is only one half of the fundamental period. This improved algorithm reduces the age of the oldest sample by half, thereby making the average age of the set of n samples one half of what it would have been. The age reduction halves the inherent delay, which in turn improves the responsiveness and bandwidth of the RMS control loop.

Referring back to FIG. 3, the mode mixing of the RMS feedback loop is illustrated. This includes two parts: a feedforward part and feedback part. The final RMS control value at node 308 is generated as:

$$RMS\_c = RMS\_r + RMS\_d$$

where RMS_r at node 302 is the $V_{set}$ RMS reference (in voltage mode) or the $I_{set}$ RMS reference (in current mode) and is the feedforward part of the RMS regulator, and RMS_d at node 312 is the feedback part of the RMS regulator. The feedback part is mainly an integrator 403 and 405 with gain 218 and 228 on the input which regulates the RMS value to the required accuracy. However, an integrator is very slow to respond to a change. For this reason, the feedforward signal path is used in the RMS loop. This configuration allows the RMS feedback loop to respond fast to a change in a pre-set voltage amplitude ($V_{set}$) while maintaining a high accuracy on steady-state. The resulting RMS control value produced at node 308 in voltage control mode is therefore the setpoint $V_{set}$ plus the integrated output error of $V_{set}$ minus the power supply output RMS voltage. This output is multiplied by the square root of 2 with multiplier 411 to obtain the peak amplitude value for input to the waveform mixer 270. This multiplier value of 1.414 is correct for sinusoidal output waveforms, and may be different depending on the waveform with which the error value is being mixed.

The mode switch logic 240 selects whether the RMS current error or RMS voltage error is input to the feedback integrator and whether the $V_{set}$ or $I_{set}$ is used in the feedforward path. This selection is controlled by a mode control variable $V_m$ which may be generated as set forth in FIG. 4.

Figure 4:
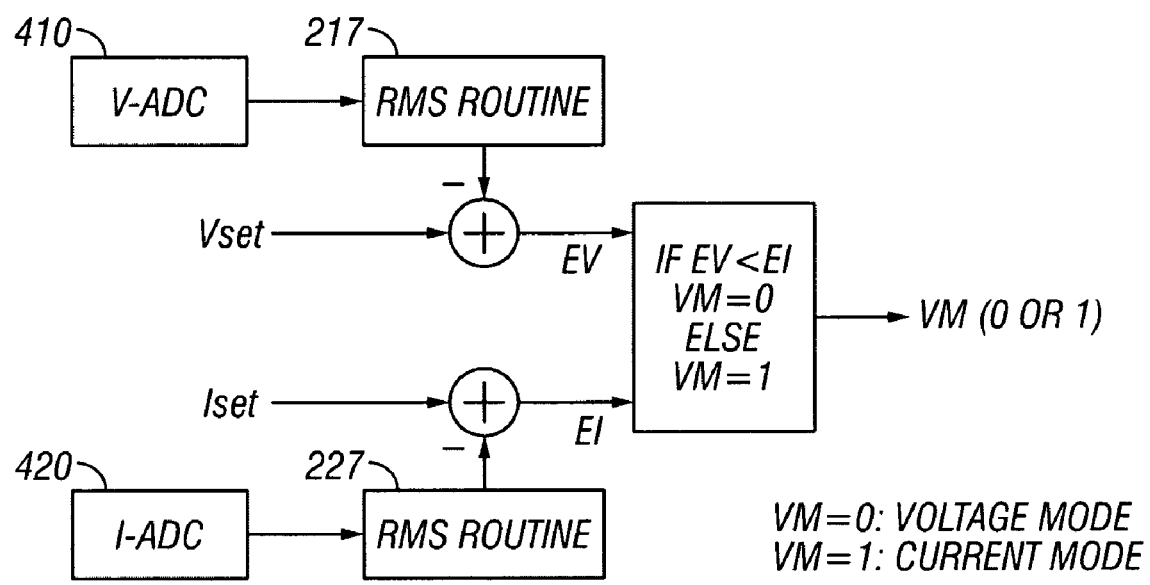
FIG. 4 is a schematic block diagram illustrating the mode control logic section of the digital feedback loop according to an embodiment of the invention.

FIG. 4 is a schematic block diagram illustrating the mode control logic section of the digital feedback loop as shown in FIG. 2 according to an embodiment of the present invention. In this embodiment, the measured RMS value of the power supply output is subtracted from the RMS voltage setpoint $V_{set}$, producing a value EV. Furthermore, the measured RMS value of the power supply output current is subtracted from the RMS current setpoint $I_{set}$, producing a value EI. These two values are compared, and if EV is less than EI, then the DEV-RMS voltage error is selected for further RMS loop processing. If EV is more than or equal to EI, then the DEI-RMS current error is selected for further RMS loop processing. Typically, when the power supply is configured to provide a regulated output voltage to the load, the current setpoint $I_{set}$ is used as an RMS current limit, and the system uses the DEV-RMS voltage error signal for further loop processing. During this operational mode, EI will be positive, and EV will fluctuate near zero. If the RMS current exceeds $I_{set}$, then EI will turn negative, be smaller than EV, and the system will then select the DEI-RMS error to prevent the RMS current from rising higher. Alternatively, the feedback could be configured to be in current mode normally, and deliver a constant RMS current to a load, with RMS overvoltage protection provided by the RMS voltage feedback loop.

Figure 5:
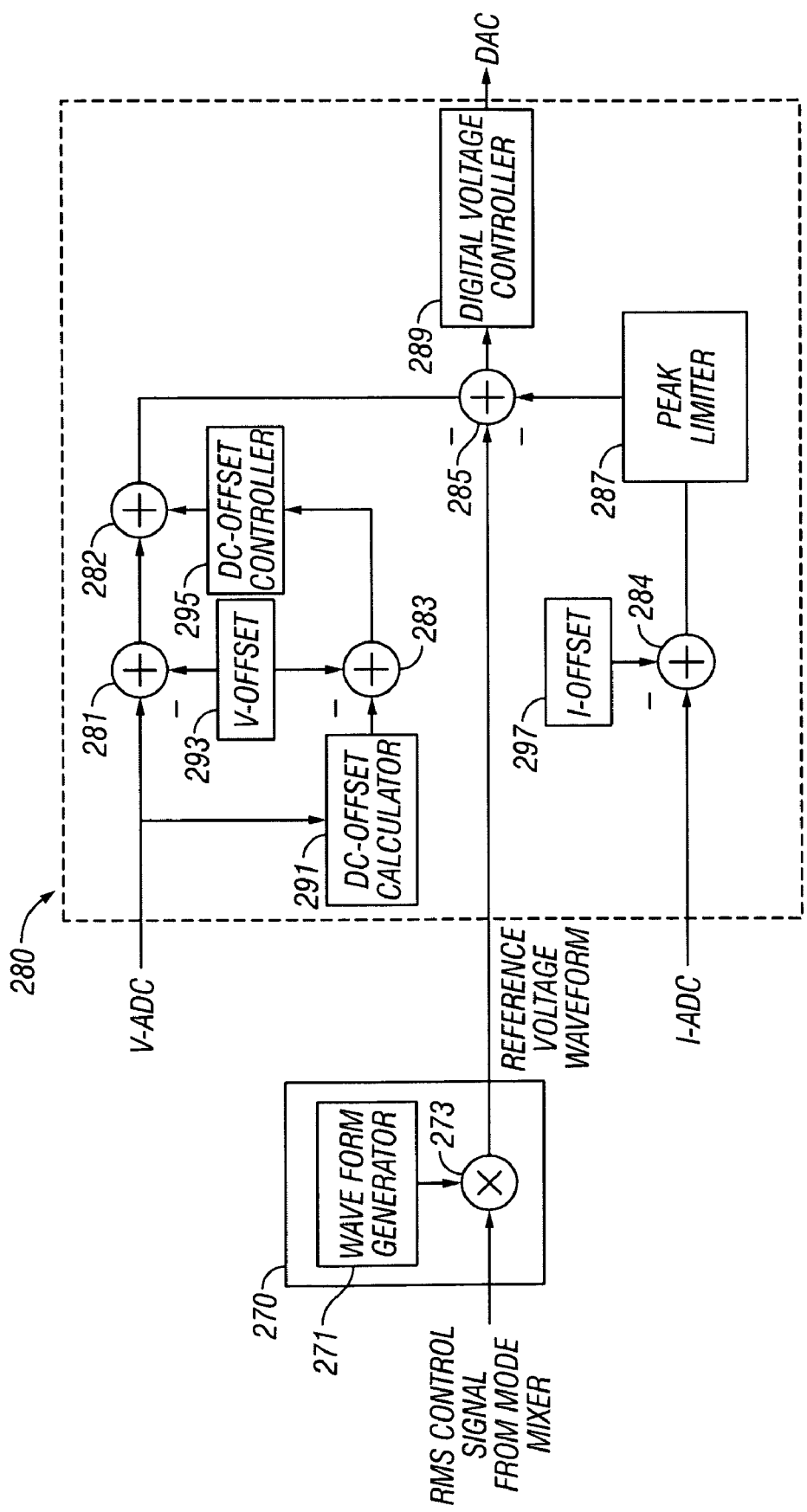
FIG. 5 is a block diagram illustrating the combined error generator section of the digital feedback loop according to an embodiment of the invention.

FIG. 5 is a block diagram illustrating the instantaneous voltage controller section of the digital feedback loop according to an embodiment of the present invention. The instantaneous voltage controller 250 includes a wave form mixer 270 and a combined V/I feedback 280. The waveform mixer includes a wave form generator 271 and a multiplier 273. The waveform mixer takes the RMS error signal and multiplies it by an AC waveform having a shape and frequency that in some embodiments is selectable by the user. This produces a reference voltage waveform that is used for the positive input of the instantaneous feedback loop. The feedback system 280 comprises an instantaneous voltage loop, an instantaneous current loop, a V/I combined subtractor 285, and a digital voltage controller 289. The instantaneous voltage loop includes a DC-offset calculator 291, a V-offset register 293, a DC-offset controller 295 and a first subtractor 281, an adder 282, and a second subtractor 283. The instantaneous current loop includes an I-offset register 297 and a third subtractor 284 and a peak limiter 287. The V/I combined subtractor 285 has a positive input, a first negative input, and a second negative input. The DC-offset controller 289 includes two function blocks—a low-pass filter and a limiter block.

In operation, the wave form mixer 270 takes an RMS error signal from the output of the mode switch 240 and multiplies the RMS error signal with the output of the wave form generator 271 to generate a reference voltage waveform. The V/I combined subtractor 285 receives the reference waveform at its positive input and the output of the instantaneous voltage loop at the first negative input and the output of the instantaneous current loop at the second negative input and generates a combined error signal. The digital voltage controller 289 may perform further signal processing, possibly including an IIR low-pass filtering and a signal limiting and sends its output to the DAC 260 for conversion into an analog control signal.

The voltage and current ADCs' inputs are a biased AC signal, with predetermined DC offset. The blocks V-offset 293 and I-offset 297 reflect this DC offset which is subtracted out of the digitized output parameters to produce a true AC signal that is nearly centered around zero. In some embodiments, the main DC offsets for the outputs of the V-ADC 410 and the I-ADC 420 are about 2V or 32768 when using 16 bit values. Since the actual DC offset may be a little different from 2V, the V-offset register 293 and the I-offset register 297 may be programmable to precisely match the actual offset level.

Even with the main DC offset of 2V removed, there may still be some DC offset that remains due to circuit imbalance, temperature drift or other reasons. To overcome the extra DC offset, a DC-offset calculator 291 may be used to calculate the offset level precisely. The normal DC offset (about 2V) is subtracted from the DC-offset calculator's output to generate an extra DC offset value. The extra DC offset value is sent to the DC-offset controller 295, whose output is added to the voltage feedback signal output of the first subtractor 281 by the adder 282.

The peak limiter 287 produces an output that is used as a negative input to the summer 285 when the output from the current ADC exceeds a user programmable limit. The output of the peak limiter is thus zero if the ADC output is below the threshold, and becomes $S*(i-I)$ for i greater than or equal to I, and $S*(i+I)$ for i less than or equal to $-I$, where i is the ADC output, and I is the programmed threshold. S is a parameter (that may be programmable) that determines how fast the limiter responds to peak current excursions above the threshold.

The voltage controller 289 may provide a variety of functions, including gain and filtering options. The parameters of this processing may be user programmable also. In one embodiment, a filter is used with a transfer function of $(bz+c)/(z-a)$. The details of the processing done by the voltage controller 289 can be selected from a wide variety of options depending on the requirements of the DAC and the construction of the power hardware.

Figure 6:
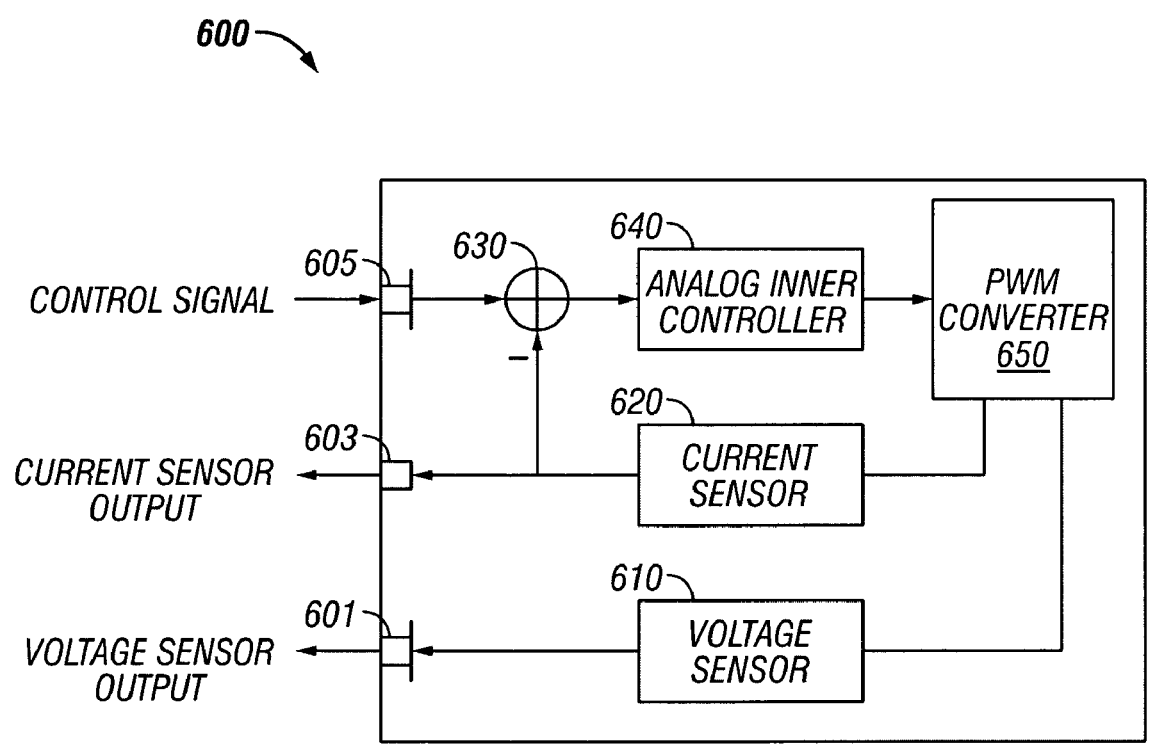
FIG. 6 is a block diagram illustrating the power hardware according to an embodiment of the present invention.

FIG. 6 is a block diagram illustrating the power hardware according to one exemplary embodiment of the present invention. The power hardware 600 includes a pulse-width-modulation (PWM) converter 650, a voltage sensor 610, a current sensor 620, and an analog inner controller 640, and an analog subtractor 630. The power hardware 600 further includes a voltage sensor output 601, a current sensor output 603, and a control input 605.

The voltage sensor 610 is configured to sense the AC output voltage, and the current sensor 620 is configured to sense the AC output current. As shown in FIG. 2 and FIG. 3, the output of the voltage sensor 610 is connected to the input of the V-ADC 410, and the output of the current sensor 620 is connected to the input of the I-ADC 420. The output of the current sensor 620 is also connected to the negative input of the analog subtractor 630. As shown in FIG. 2, the DAC 260 receives the digital combined error signal from the combined V/I feedback 280 and converts the digital combined error signal into an analog control signal. The output of the DAC is connected to the positive input of the analog subtractor 630. The output of the analog subtractor 630 is connected to the input of the analog inner controller 640. The output of the analog inner controller 640 is connected to the control the PWM converter 650.

In operation, the voltage sensor 610 outputs a signal that is related to the AC output voltage. The current sensor outputs a signal that is related to the AC output current. As shown in FIG. 3, these outputs are used by the DEV-RMS generator 210 and the DEI-RMS generator 220 to generate the RMS voltage error (DEV-RMS) signal and the RMS current error (DEI-RMS) signal. The analog control signal generated by the DAC 260 is fed as the positive input to the inner PWM control loop. The analog inner controller 640 receives the output from the analog subtractor 630 and utilizes the output to control the PWM converter 650 so as to regulate the power supply output.

Figure 7:
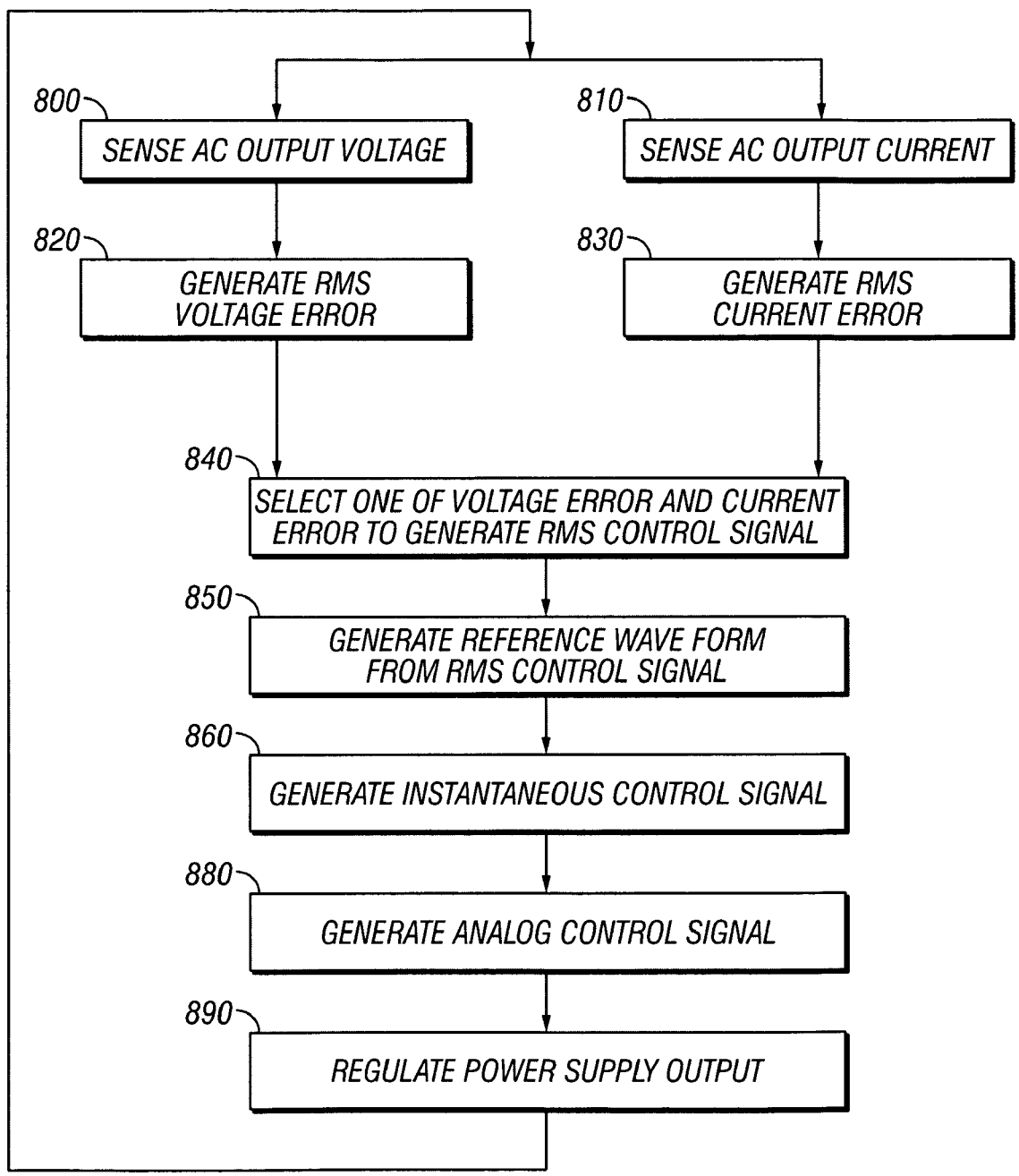
FIG. 7 is a flow diagram illustrating the method of providing the digital feedback loop of the power supply according to an embodiment of the present invention.

FIG. 7 is a flow diagram illustrating a method of digitally implementing feedback to regulate an AC power supply according to an embodiment of the present invention. The method includes sensing the power supply AC output voltage at 800 and sensing the power supply AC output current at 810. The method of providing a digital feedback according to one embodiment also includes generating an RMS voltage error signal at 820 and generating an RMS current error signal at 830. The method further includes selecting one of the RMS error signals at 840. At 850, the selected signal is used to generate a reference waveform. The method further includes generating an instantaneous error signal at 860. As described above, this may be performed by combining the reference signal with output feedback signals. The method further includes generating an analog control signal at 880 from the instantaneous error signal. At block 890, power supply output is regulated with the analog control signal.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A power supply comprising:
   power hardware having an AC power output configured for coupling to a load impedance, the AC power output configured to provide an AC output voltage and an AC output current to the load impedance;
   an interface for selecting an output voltage or an output current of said power supply for application to said load impedance;
   one or more output parameter sensors configured to sense power supply output voltage and output current;
   analog to digital converters configured to produce digital representations of said sensed output voltage and current; and
   a digital feedback loop receiving said digital representations and coupled to regulate the power hardware, wherein said digital feedback loop comprises:
      an RMS voltage generator in a first feedback loop, said first feedback loop configured to generate an RMS voltage error signal;
      an RMS current generator in a second feedback loop, said second feedback loop configured to generate an RMS current error signal;
      mode selection and processing logic configured to generate a power hardware RMS control signal derived at least in part from a selected one of the RMS voltage error signal and the RMS current error signal; and
      an instantaneous voltage control signal generator in a third feedback loop receiving said digital representations of said sensed power supply output voltage and current and also receiving a signal derived at least in part from said power hardware RMS control signal, said third feedback loop configured to generate an instantaneous output voltage control signal that sets the power hardware output to a desired output waveform having said pre-set RMS output voltage or said pre-set RMS output current depending on whether the RMS voltage error signal or RMS current error signal is selected by said mode selection and processing logic.

2. The power supply of claim 1, wherein the AC output voltage is sinusoidal.

3. The power supply of claim 1, wherein
the RMS voltage error signal is a difference between a pre-set voltage RMS amplitude and an RMS value of the AC output voltage; and
the RMS current error signal is a difference between a pre-set current RMS amplitude and an RMS value of the AC output current.

4. The power supply of claim 1, wherein the mode selection and processing logic selects one of said error signals based on the values of the RMS voltage error signal and the RMS current error signal.

* * * * *